United States Patent Office 3,038,888
Patented June 12, 1962

3,038,888
NEW NITROGENOUS ORGANIC COMPOUNDS
George E. P. Smith, Jr., Akron, Ohio, assignor to The Firestone Tire & Rubber Company, Akron, Ohio, a corporation of Ohio
No Drawing. Filed June 16, 1958, Ser. No. 741,992
3 Claims. (Cl. 260—79.5)

This invention relates to a new group of chemical compounds, the N-to-octyl 2-benzothiazolesulfenamide, and the application of these substances to the acceleration of rubber vulcanization. The new compounds, also known as N-tert-octyl-benzthiazyl-2-sulphenamides, have the following formula:

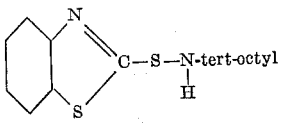

The new compounds can be prepared by reacting benzthiazyl-2-sulphenamide with a tert-octylamine. Alternatively, the new sulfenamides can be produced by condensing a tert-octylamine with 2-mercaptobenzothiazole in the presence of an oxidizing agent, or by first producing a tert-octylchloramine and reacting it with the sodium salt of 2-mercaptobenzothiazole. The tert-octylamine utilized can be any one of the seventeen primary tert-octylamines. The sulfenamides of the invention are illustrated by the following examples:

EXAMPLE 1

A mixture of 8.35 grams (0.05 mole) of 2-mercaptobenzothiazole and 17 ml. of water was stirred with 32.2 grams (0.25 mole) of tert-octylamine in 25 ml. of water. Then the mixture was maintained at 35° C. or below (room temperature) during the gradual addition, with stirring, of 0.10 mole (40 ml. of 2.5 molar) aqueous sodium hypochlorite solution. Thereafter the reaction mixture was poured into ice water, and the resulting oily solid crude product was separated by filtration with suction. After recrystallization from diethyl ether the product, N-tert-ocyl-2-benzothiazolesulfenamide, melted at 100–107° C. A yield of 6.5 grams of the product or 45% of theory was obtained.

EXAMPLE 2

Solid 2-mercaptobenzothiazole (16.7 grams, 0.10 mole) was mixed with 12.9 grams (0.10 mole) of liquid tert-octylamine. The temperature of the mixture increased appreciably and rapidly, indicating that reaction had occurred. The resulting dry salt was dissolved in 250 ml. of dioxane at 65° C. and then cooled to 10° C. The solution was then stirred during the gradual addition thereto of 46 ml. of 2.5 molar sodium hypochlorite solution (0.115 mole). A resulting precipitate of sodium chloride was filtered off and discarded. Water was added to the clear filtrate to cause an oil to separate. The oil was extracted with diethyl ether, the ether extract was washed with water, and the washed extract was dried over anhydrous magnesium sulfate. The dehydrated ether solution was separated and then cooled, whereupon nine grams (31% yield) of pure white crystalline N-tert-octyl-2-benzothiazolesulfenamide separated.

EXAMPLE 3

In a 500 ml., 3-neck flask equipped with a mechanical stirrer and a dropping funnel there were placed 16.7 grams (0.10 mole) of 2-mercaptobenzothiazole in 50 ml. of water. To this mixture at room temperature there was added, with stirring, 64.5 grams (0.50 mole) of tt-octylamine. The resulting salt solution was maintained at room temperature (approximately 25° C.) during the gradual addition through the dropping funnel of 0.20 mole (80 ml. of 2.5 molar) of aqueous sodium hypochlorite solution, with continued stirring of the contents of the flask. Thereafter the reaction mixture was poured into cold water. A white solid which precipitated was separated by filtration with suction and then was washed with water to remove excess amine. The crude product was dried and recrystallized from ether to yield 17.0 grams (58% of theory) of N-tt-octyl-2-benzothiazolesulfenamide (also known as N-α,α,γ,γ-tetramethylbutyl benzthiazyl-2-sulphenamide), melting at 100–101° C. A sample of the pure product was analyzed for carbon and hydrogen, and the following results were obtained:

|  | Percent Carbon | Percent Hydrogen |
|---|---|---|
| Calculated from formula | 61.17 | 7.53 |
| Found | 61.21 | 7.43 |

Thus the product of this example possessed the structure:

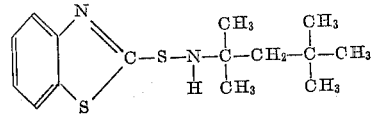

EXAMPLE 4

The general method of Example 3 was carried out with a mole ratio of tt-octylamine to mercaptobenzothiazole of approximately 2.5 to 1. To this end 16.7 grams (0.098 mole) of 98% 2-mercaptobenzothiazole (commercial grade) was dispersed in 45 ml. of water. To this mixture there was added 32.3 grams (0.25 mole) of tt-octylamine with stirring and cooling. During one hour there was added 71 ml. of 1.77 molar sodium hypochlorite solution (made by diluting 45.5 ml. of 2.75 molar sodium hypochlorite solution with water), while the temperature of the reaction mixture was maintained at 28 to 30° C. The resulting suspended solid was quite soft and not granular, indicating that the excess of amine was causing the sulfenamide to be a liquid-solid mixture. The mixture was stirred for 1.25 hours at room temperature after all the hypochlorite had been added. Then the mixture was poured into a liter of ice water. The slurried product was filtered, reslurried with water and again filtered. Thereafter the product was washed on the filter with water until the filtrate was neutral to litmus (four washings). The product was allowed to air-dry overnight. The tan product, N-tt-octyl-2-benzothiazolesulfenamide, 100% soluble in diethyl ether, melted at 95 to 98° C. and weighed 27.2 grams corresponding to a 94.5% yield.

EXAMPLE 5

Commercial 98% 2-mercaptobenzothiazole (33.4 grams, 0.196 mole) was dissolved in a sodium hydroxide solution (8 grams NaOH in 50 ml. water), and the solution was filtered through glass wool. To this solution there was added with rapid stirring and cooling (to 30° C.) 38.7 grams (0.3 mole) of tt-octylamine, and stirring was continued for an additional 10 minutes. There was then added with rapid stirring and cooling 33 ml. of a 25% sulfuric acid solution (made by dissolving 27 grams of 93% sulfuric acid in 73 ml. of water, total volume of diluted acid being 85 ml.). At this point the mercaptobenzothiazole had separated as pellets approximately pinhead in size. A solution of sodium hypochlorite was then added (86.5 ml. of 2.75 molar sodium hypochlorite solution diluted to 120 ml. with water) during 1⅚ hours at 28–30° C. The mixture was stirred an additional hour and 20 minutes at room temperature. The amine-water azeotrope was removed by vacuum distillation: pot temperature 42° C., vapor temperature 41° C., vacuum 50 to 60 mm. of mercury. The distillate consisted of a top organic layer of 10 ml. and a bottom aqueous layer of 40 ml. The contents of the pot were filtered, reslurried twice with water, filtered, and washed on the filter until the aqueous filtrate was neutral to litmus. The solid product was allowed to air-dry overnight. The resulting ether-soluble gray product, N-tt-octyl-2-benzothiazolesulfenamide, melted at 94 to 99° C., and weighed 54 grams, corresponding to a yield of 93.8% of theory.

Other specific examples of the sulfenamides of the invention are:

N-1,1-dimethylhexyl-2-benzothiazolesulfenamide
N-1,1,4-trimethylpentyl-2-benzothiazolesulfenamide
N-1,1,3-trimethylpentyl-2-benzothiazolesulfenamide
N-1,1,2-trimethylpentyl-2-benzothiazolesulfenamide
N-1,1,3,4-tetramethylbutyl-2-benzothiazolesulfenamide
N-1,1,2,2-tetramethylbutyl-2-benzothiazolesulfenamide
N-1,1-dimethyl-2-ethyl-butyl-2-benzothiazolesulfenamide
N-1-methyl-1-ethyl-pentyl-2-benzothiazolesulfenamide
N-1,2-dimethyl-1-ethylbutyl-2-benzothiazolesulfenamide
N-1,3-dimethyl-1-ethylbutyl-2-benzothiazolesulfenamide
N-1-methyl-1-n-propyl-butyl-2-benzothiazolesulfenamide
N-1,1-diethylbutyl-2-benzothiazolesulfenamide
N-1,2,2-trimethyl-1-ethylpropyl-2-benzothiazolesulfenamide
N-1,1-diethyl-2-methylpropyl-2-benzothiazolesulfenamide
N-1,2-dimethyl-1-n-propylpropyl-2-benzothiazolesulfenamide
N-1,2-dimethyl-1-isopropylpropyl-2-benzothiazolesulfenamide All of the above-identified examples of N-tert-octyl-benzthiazyl-2-sulphenamides are stable, crystalline solids and are excellent delayed action accelerators of the sulfur vulcanization of natural or synthetic rubber. They are especially useful in modern tire tread compositions reinforced by the newer reinforcing oil furnace blacks, which have largely replaced the heretofore standard channel carbon blacks in tire treads. The new furnace blacks, e.g., HAF, ISAF and SAF blacks, have recently come into wide-scale use in the rubber industry because they impart longer tread life to tires than did the channel blacks. Whereas the channel blacks were acidic in reaction and inhibited vulcanization to some extent, the new reinforcing furnace blacks are alkaline, displaying pH values above 7.0. Perhaps partly because of their alkalinity the new furnace blacks have been difficult to handle in modern high speed rubber processing equipment, because they tend to make rubber compositions containing them "scorchy," the compositions tending to set up or pre-cure before the end of the mechanical working of the compositions during processing in banbury mixers, mills, calenders and extruders. A scorched rubber composition, of course, must be scrapped. Many conventional accelerators which have enjoyed long and satisfactory usage in channel black rubber compositions are not acceptable in rubber compositions reinforced by a substantial proportion (20 to 80 phr.) of any of the new furnace blacks mentioned, because of the scorchiness of these compositions. On the other hand, the N-t-octyl-2-benzothiazole-sulfenamides of the invention have been found to be excellent delayed-action accelerators in reinforcing furnace black tire tread compositions, and especially so in natural rubber and in the new high cis synthetic polyisoprene rubbers.

The sulfenamides of the invention are effective delayed-action vulcanization accelerators in any of the sulfur-vulcanizable diene rubbers including, without limitations, natural rubber, various synthetic rubbers such as SBR (butadiene-styrene), BR (butadiene rubbers), IR (synthetic isoprene rubbers), ABR (acrylate-butadiene rubbers), PBR (pyridine-butadiene rubbers), SIR (styrene-isoprene rubbers), neoprene (polychloroprene or CR), butyl rubber (IIR) and suitable mixtures thereof.

(The abbreviations are in accord with the ASTM designation: D1418-56T.) The usual curing temperatures employed by the art can be utilized, suitably in the range from about 250° to about 400° F. The amount of accelerator employed will depend on the particular rubber composition being vulcanized, as will be understood by one skilled in the art, for example, between 0.05 and 10 parts by weight per one hundred parts of the rubber (phr.), and preferably between 0.2% and 3.0% of the weight of the rubber. The sulfenamides of the invention are effective accelerators of vulcanization by free sulfur or by a vulcanizing agent of the sulfur-donor type, including without limitation various known phenol polysulfides including the alkyl derivatives thereof, the xanthogen polysulfides, the thiuram disulfides and other polysulfides, various amine polysulfides including the dialkylamine polysulfides, heterocyclic amine polysulfides and reaction products of primary amines with excess sulfur. The sulfenamides are useful in all types of rubber stocks and can be mixed with the rubber on a rubber mill, in a banbury, in a solvent rubber cement, in latex or water dispersion or in any other manner known to the art of mixing a compounding ingredient with a rubber.

To demonstrate the superior accelerating properties of the sulfenamides of the invention the product of Example 3 was tested in a natural rubber tire tread composition containing a high loading of a reinforcing oil furnace black in accordance with Formula A.

*Formula A*

| Ingredients | Parts by Weight | |
|---|---|---|
| | I | II |
| Rubber | 100 | 100 |
| HAF carbon black | 50 | 50 |
| Stearic acid | 2 | 2 |
| Zinc oxide | 3 | 3 |
| Sulfur | 2.5 | 2.5 |
| Pine tar | 2 | 2 |
| Plasticizer (coal tar distillate) | 2 | 2 |
| Antioxidant | 1.5 | 1.5 |
| N-t-Octyl-2-benzothiazolesulfenamide | 0.6 | 0.8 |

Each of the two rubber compositions in accordance with Formula A was thoroughly mixed in the usual manner on a rubber mill, and then a portion of each was vulcanized at 280° F. for 15, 30 and 60 minutes. The following tensile data were obtained. ("p.s.i." means pounds per square inch):

TABLE 1
NORMAL PROPERTIES

| Composition | I | II |
|---|---|---|
| Modulus at 300% (p.s.i.): | | |
| 15 minutes | 1,625 | 1,900 |
| 30 minutes | 2,250 | 2,400 |
| 60 minutes | 2,500 | 2,550 |
| Tensile strength (p.s.i.): | | |
| 15 minutes | 3,950 | 4,400 |
| 30 minutes | 4,425 | 4,450 |
| 60 minutes | 4,175 | 4,250 |
| Elongation at break (percent): | | |
| 15 minutes | 570 | 570 |
| 30 minutes | 530 | 520 |
| 60 minutes | 470 | 450 |

PROPERTIES AFTER AGING 2 DAYS IN AIR OVEN AT 212° F.

| | I | II |
|---|---|---|
| Modulus at 300%: | | |
| 15 minutes | 2,350 | 2,875 |
| 30 minutes | 2,500 | 2,975 |
| 60 minutes | | |
| Tensile strength: | | |
| 15 minutes | 3,200 | 3,425 |
| 30 minutes | 2,600 | 2,925 |
| 60 minutes | 1,850 | 2,625 |
| Elongation: | | |
| 15 minutes | 400 | 360 |
| 30 minutes | 310 | 300 |
| 60 minutes | 220 | 270 |

Table 1 shows that the new sulfenamides are strong accelerators, imparting high tensile properties to the tire tread vulcanizate, which stand up exceedingly well after the drastic aging treatment.

In a similar manner the novel sulfenamide was tested as an accelerator in a synthetic rubber tire tread composition containing a substantial proportion of a reinforcing oil furnace black in accordance with Formula B.

*Formula B*

| Ingredients: | Parts by weight |
|---|---|
| SBR [1] | 100 |
| HAF carbon black | 48 |
| Petroleum oil (naphthenic) | 8 |
| Zinc oxide | 3 |
| Sulfur | 2 |
| Stearic acid | 2 |
| Antioxidant | 0.6 |
| N-t-octyl-2-benzothiazolesulfenamide | 1.2 |

[1] Produced by polymerization at 41° F.

After the composition was mixed in accordance with Formula B in the usual manner on a rubber mill, it was heated for 30, 45, 60 and 90 minutes at 280° F. The portion heated for 30 minutes failed to vulcanize, thus demonstrating the extreme delayed action properties of the novel sulfenamides. Tensile properties of the 45, 60 and 90 minute cures are shown in Table 2.

TABLE 2
NORMAL PROPERTIES

| Modulus at 300%: | |
|---|---|
| 45 minutes | 700 |
| 60 minutes | 1425 |
| 90 minutes | 2000 |
| Tensile strength: | |
| 45 minutes | 2475 |
| 60 minutes | 3475 |
| 90 minutes | 3525 |
| Elongation: | |
| 45 minutes | 680 |
| 60 minutes | 580 |
| 90 minutes | 470 |

PROPERTIES AFTER AGING 2 DAYS IN AIR OVEN AT 212° F.

| Modulus at 300%: | |
|---|---|
| 45 minutes | 2300 |
| 60 minutes | 3125 |
| 90 minutes | -- |
| Tensile strength: | |
| 45 minutes | 2875 |
| 60 minutes | 3200 |
| 90 minutes | 3250 |
| Elongation: | |
| 45 minutes | 360 |
| 60 minutes | 305 |
| 90 minutes | 295 |

Table 2 shows that the new sulfenamides impart excellent tensile properties to a commercial butadiene-styrene synthetic rubber, and that these high properties are substantially maintained after the severe heat aging treatment.

The N-tt-octyl-2-benzothiazolesulfenamide, produced as in the above examples, was tested in a natural rubber tire tread composition in accordance with Formula C.

*Formula C*

| Ingredients: | Parts by weight |
|---|---|
| Rubber | 100 |
| HAF carbon black | 50 |
| Zinc oxide | 3 |
| Pine tar | 4 |
| Stearic acid | 3 |
| Antioxidant | 2 |
| Sulfur | 2 |
| N-tt-octyl-2-benzothiazolesulfenamide | 0.5 |

The rubber composition mixed in the usual manner in accordance with Formula C was vulcanized by heating separate portions for 30, 45, 60 and 90 minutes at 280° F. Tensile properties of the vulcanizates are shown in Table 3.

TABLE 3

| Modulus at 300%: | |
|---|---|
| 30 minutes | 1800 |
| 45 minutes | 1950 |
| 60 minutes | 2025 |
| 90 minutes | 2000 |
| Modulus at 400%: | |
| 30 minutes | 2625 |
| 45 minutes | 2900 |
| 60 minutes | 2950 |
| 90 minutes | 2900 |
| Tensile strength: | |
| 30 minutes | 3625 |
| 45 minutes | 3700 |
| 60 minutes | 3625 |
| 90 minutes | 3525 |
| Elongation: | |
| 30 minutes | 550 |
| 45 minutes | 490 |
| 60 minutes | 490 |
| 90 minutes | 475 |

Another unvulcanized portion of the composition according to Formula C was evaluated by the Mooney Scorch test performed at 250° F. in accordance with the article by R. Shearer, A. E. Juve and J. H. Musch, India Rubber World, volume 117, pages 216–219 (1947). The test values in Table 4 are in minutes.

TABLE 4

| Mooney Scorch at 250° F.: | |
|---|---|
| Initial scorch | 23.3 |
| 10 point rise | 30 |

Tables 3 and 4 show that, although the sulfenamides of the invention impart excellent tensile properties to the usually scorchy furnace black tire tread composition, the new accelerators are sufficiently delayed in action for trouble-free use in a commercial tire plant. Another mixing in accordance with Formula C was divided into two unvulcanized portions, one being evaluated immediately as above and the other evaluated after one year of shelf-aging at room temperature. The portion aged one year displayed even less tendency to scorch than did the portion evaluated immediately after mixing, although the vulcanizate from the aged portion displayed excellent tensile properties, comparable to those displayed by the vulcanizate of the unaged composition.

The N-tt-octyl-2-benzothiazolesulfenamide was tested in Formula B. A portion of the unvulcanized composition was evaluated by the Mooney Scorch test at 265° F., results of which are shown in Table 5.

TABLE 5

| Mooney Scorch at 265° F.: | |
|---|---|
| Initial scorch | 40+ |
| 10 point rise | 40+ |

Table 5 shows that synthetic rubber tire tread composition was extremely safe from the standpoint of scorch. Other portions of the composition were vulcanized at 60 and 90 minutes at 280° F., and physical properties of the vulcanizates are given in Table 6.

TABLE 6
NORMAL PROPERTIES

| Modulus at 300%: | |
|---|---|
| 60 minutes | 1425 |
| 90 minutes | 2125 |
| Tensile strength: | |
| 60 minutes | 3375 |
| 90 minutes | 3450 |
| Elongation: | |
| 60 minutes | 570 |
| 90 minutes | 420 |

PROPERTIES AFTER AGING 2 DAYS IN AIR OVEN AT 212° F.

Modulus at 300%:
  60 minutes _____ —
  90 minutes _____ —
Tensile strength:
  60 minutes _____ 3175
  90 minutes _____ 2800
Elongation:
  60 minutes _____ 295
  90 minutes _____ 255

The N-tt-octyl-2-benzothiazolesulfenamide was tested in a fast-curing natural rubber composition containing an unusually high loading of furnace black, in accordance with Formula D.

Formula D

Ingredients:    Parts by weight
  Rubber _____ 100
  HAF carbon black _____ 60
  Stearic acid _____ 3.4
  Sulfur _____ 2.4
  Medium process oil _____ 8
  Zinc oxide _____ 7.5
  N-tt-octyl-2-benzothiazolesulfenamide ___ 1

Physical properties of the vulcanizates cured at 280° F. are shown in Table 7.

TABLE 7

Modulus at 300%:
  15 minutes _____ 2200
  30 minutes _____ 2950
  15 minutes [1] _____ 3050
  60 minutes _____ —
Tensile strength:
  15 minutes _____ 3275
  30 minutes _____ 3250
  45 minutes _____ 3200
  60 minutes _____ 3075
Elongation:
  15 minutes _____ 415
  30 minutes _____ 335
  45 minutes _____ 295
  60 minutes _____ 275

[1] 2 of 3 test strips.

A portion of the unvulcanized composition according to Formula D was evaluated by the Mooney Scorch test at 250° F., the results being shown in Table 8.

TABLE 8

Mooney Scorch at 250° F.:
  Initial scorch _____ 20
  10 point rise _____ 27

Tables 7 and 8 show that, even in a very scorchy formula including unusually high proportions of accelerator and reinforcing oil furnace black, the sulfenamides of the invention produced high tensile properties at short curing times but without imparting scorchiness to the unvulcanized composition.

I claim:
1. N-tert-Octyl-benzthiazyl-2-sulphenamide having the formula:

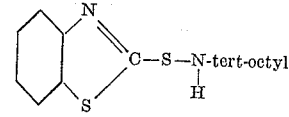

wherein the tert-octyl group is the $\alpha,\alpha,\gamma,\gamma$-tetramethylbutyl group.

2. Process for the vulcanization of a sulfur-vulcanizable diene rubber selected from the group consisting of natural rubber, styrene-butadiene rubbers, butadiene rubbers, synthetic isoprene rubbers, acrylate-butadiene rubbers, pyridine-butadiene rubbers, styrene-isoprene rubbers, neoprene and butyl rubber which comprises incorporating in the rubber before vulcanization 0.05 to 10 phr. of an N-tert-octyl-benzthiazyl-2-sulphenamide as claimed in claim 1, and then vulcanizing the mixture so obtained at a temperature in the range of 250° to 400° F.

3. A vulcanizable composition comprising a sulfur-vulcanizable diene rubber selected from the group consisting of natural rubber, styrene-butadiene rubbers, butadiene rubbers, synthetic isoprene rubbers, acrylate-butadiene rubbers, pyridine-butadiene rubbers, styrene-isoprene rubbers, neoprene and butyl rubber, sulfur and 0.05 to 10 phr. of sulphenamide as claimed in claim 1.

References Cited in the file of this patent

UNITED STATES PATENTS

| | | |
|---|---|---|
| 2,339,552 | Carr | Jan. 18, 1944 |
| 2,367,827 | Smith, Jr. | Jan. 23, 1945 |
| 2,393,500 | Carr | Jan. 22, 1946 |
| 2,415,029 | Smith, Jr. | Jan. 28, 1947 |
| 2,807,621 | Cooper et al. | Sept. 24, 1957 |

UNITED STATES PATENT OFFICE

CERTIFICATE OF CORRECTION

Patent No. 3,038,888            June 12, 1962

George E. P. Smith, Jr.

It is hereby certified that error appears in the above numbered patent requiring correction and that the said Letters Patent should read as corrected below.

Column 1, line 10, for "N-to-octyl" read -- N-t-octyl --; line 43, for "N-tert-ocyl-" read -- N-tert-octyl- --; line 44, for "100-107° C." read -- 100-101° C. --; column 7, line 31, for "15 minutes" read -- 45 minutes --.

Signed and sealed this 5th day of April 1966.

SEAL)

Attest:

ERNEST W. SWIDER            EDWARD J. BRENNER
Attesting Officer            Commissioner of Patents